United States Patent [19]
Bodker et al.

[11] Patent Number: 5,172,512
[45] Date of Patent: Dec. 22, 1992

[54] TRAP FOR CATCHING MICE AND RATS

[75] Inventors: Alan N. Bodker, Wayne, N.J.; Craig E. Karasin, Tappan, N.Y.

[73] Assignee: Sterling Drug, Inc., New York, N.Y.

[21] Appl. No.: 747,161

[22] Filed: Aug. 19, 1991

[51] Int. Cl.⁵ .............................................. A01M 23/30
[52] U.S. Cl. .............................................. 43/81; 43/83
[58] Field of Search ...................... 43/81, 81.5, 82, 83, 43/83.5, 75

[56] References Cited

U.S. PATENT DOCUMENTS

| | | | |
|---|---|---|---|
| 1,275,993 | 8/1918 | Spangler | 43/81 |
| 2,492,957 | 1/1950 | Blair | 43/81 |
| 2,525,010 | 10/1950 | Allison | 43/83.5 |
| 2,684,553 | 7/1954 | Schroeder | 43/81 |
| 3,992,803 | 11/1976 | Kaiser | 43/83 |
| 4,341,033 | 7/1982 | Siegel | 43/81 |
| 4,607,450 | 8/1986 | Kaiser et al. | 43/83 |

FOREIGN PATENT DOCUMENTS 358154 9/1922 Fed. Rep. of Germany .......... 43/75

Primary Examiner—Kurt C. Rowan
Attorney, Agent, or Firm—Millen, White, Zelano and Branigan

[57] ABSTRACT

A trap for catching mice and rats includes a standard mousetrap mounted within a two-part housing. The standard mousetrap includes a tab which projects through a slot an arcuate upper wall of one portion of the housing, allowing one to cock the trap from the exterior of the housing. The first portion of the housing is pivoted to the second portion of the housing so that the housing can be conveniently opened to dispose of a mouse or rat caught in the trap. The housing shields the cocked trap so as to enhance the safety thereof while allowing one to empty the trap without running the risk of touching the mouse or rat caught therein.

21 Claims, 3 Drawing Sheets

TRAP FOR CATCHING MICE AND RATS

TECHNICAL FIELD

This invention relates to traps for catching mice and rats. More particularly, this invention relates to traps for catching mice and rats which include trap mechanisms in combination with housings enclosing the trap mechanisms.

BACKGROUND ART

Mice and rats are ubiquitous creatures who have plagued mankind since humans began storing food millennia ago. The rodents' intelligence at times appears to approach our own, while their reproductive rate far exceeds ours. As man has proliferated so have mice and rats. It is estimated that they currently consume or contaminate $2,000,000,000 worth of grain a year in the U.S. alone. While our efforts to control their numbers at grain storage facilities have had only marginal success, we have been able to achieve a degree of success in our dwellings by using the conventional mouse trap exemplified in patents such as expired U.S Pat. Nos. 1,464,559 and 1,250,022.

Such conventional mousetraps include a spring-biased striking element comprising a striker bar which is retained in a cocked position by a trigger member. The trigger member has bait placed thereon, or disposed proximate thereto, so that a mouse or rat attracted to the bait trips the trigger member, releasing the striker bar which under the influence of a powerful coil spring dispatches the mouse or rat within microseconds. Despite their vaunted intelligence, mice and rates have been unable to resist bait placed on these traps.

In addition, many people find dead mice rather repugnant and would rather neither touch nor run the risk of touching a deceased mouse when emptying a trap, so they throw away the entire trap rather than releasing the dead mouse from the trap.

The patent literature includes a host of mousetraps and numerous mousetraps which utilize housings in combination with trapping mechanisms. Of particular interest with respect to the instant, invention is U.S. Pat. No. 2,059,937 which issued to Ellis in 1936. Ellis discloses a semicircular housing formed by a bottom, sides and a semicircular cover. Within the housing of Ellis is disposed an ordinary mousetrap having a base and a spring-actuated striker bar. The spring element is retained by a latch when in the cocked position. It is moved to the cocked position by a lever pivoted to the outside of the housing and having a portion projecting through an arcuate slot in the side wall of the housing to engage the striker bar. With the Ellis patent, convenient access to the baiting station is not provided. Consequently, the baiting station cannot be easily baited nor the deceased mouse easily removed from the trap.

Other patents of possible interest in that they utilize housings in combination with traps are U.S. Pat. Nos. 4,306,370; 4,127,958; 4,688,348; 4,557,067; 2,803,918; and U.S. Pat. No. 2,684,553. These patents do not take advantage of the proven configuration of conventional mousetrap mechanisms such as the mechanisms exemplified in expired U.S. Pat. Nos. 1,248,944; 2,247,652; 2,544,475, 2,517,928; 2,616,211; 2,637,932; and U.S. Pat. No. 2,640,293, which mechanisms are incorporated at least in part in such unexpired patents as U.S. Pat. Nos. 4,711,049; 4,297,805; and U.S. Pat. No. 4,369,595 to Kness et. al.

In view of the aforementioned considerations, there is a need for a new and improved way to employ the advantages of current mousetraps while minimizing the hazards and unpleasantness associated therewith.

SUMMARY OF THE INVENTION

It is an object of the instant invention to provide a new and improved housed mousetrap, wherein the trap is shielded in such a way as to enhance safety for people and pets while not being visually unappealing and allowing one to empty the trap without touching a deceased mouse or rat.

Upon further study of the specification and appended claims, further objects and advantages of this invention will become apparent to those skilled in the art.

In view of the aforementioned object and other objects, the instant invention contemplates a housing for containing a trap mechanism wherein the housing is comprised of a base for supporting the mousetrap and first and second housing portions. The first housing portion is fixed to the base and overlies at least a portion of the trap mechanism. A slot is formed in the first housing portion for providing access to the trap mechanism in order to cock the trap mechanism. The second housing portion has an opening therein through which the mouse enters, and is movably mounted with respect to the first housing and base. The second housing portion selectively shields and exposes the trap mechanism so that the trap mechanism can be easily accessed for baiting and emptying after a mouse is caught.

The instant invention further contemplates a mousetrap and housing in combination wherein the mousetrap includes a spring-biased striking element comprising a striking bar and a cocking bar, with the cocking bar projecting at an angle with respect to the striker bar and having a tab extending therefrom through a slot in the housing. The mousetrap further includes a trigger member proximate the spring biased striking element. The spring-biased striking element and trigger member are pivotally mounted with respect to a base of the housing to which a first housing portion having the slot therein is fixed so as to at least partially enclose the mousetrap. A second housing portion, having a hole therein through which a mouse can enter, is pivoted to the first housing portion and cooperates therewith to completely enclose the trap with the opening in the second housing portion located adjacent to the trigger of the mousetrap. A deceased mouse can be removed from the trap by rotating the spring-biased striking element slightly toward the cocked position to release the mouse while the second housing portion is pivoted with respect to the first housing portion to open the housing so that the mouse can drop out.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DESCRIPTION OF THE PREFERRED EMBODIMENTS

Figure 1:
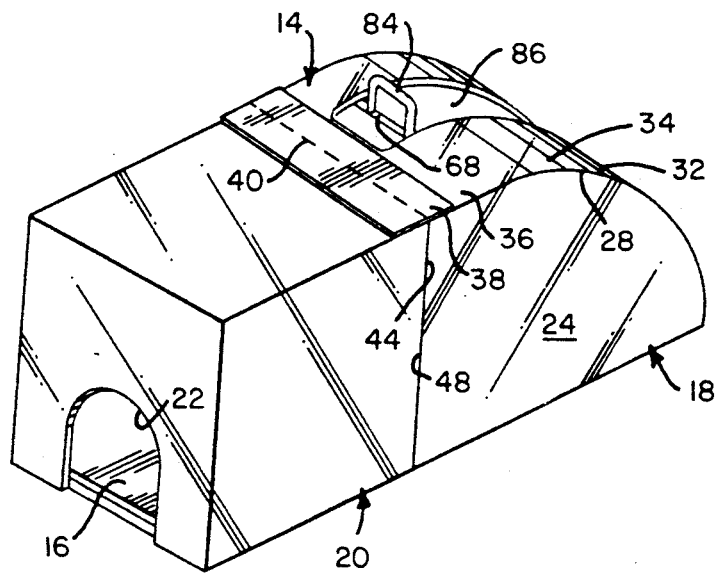
FIG. 1 is a perspective view of a mousetrap mechanism in combination with a mousetrap housing in accordance with the principles of the instant invention.
Figure 2:
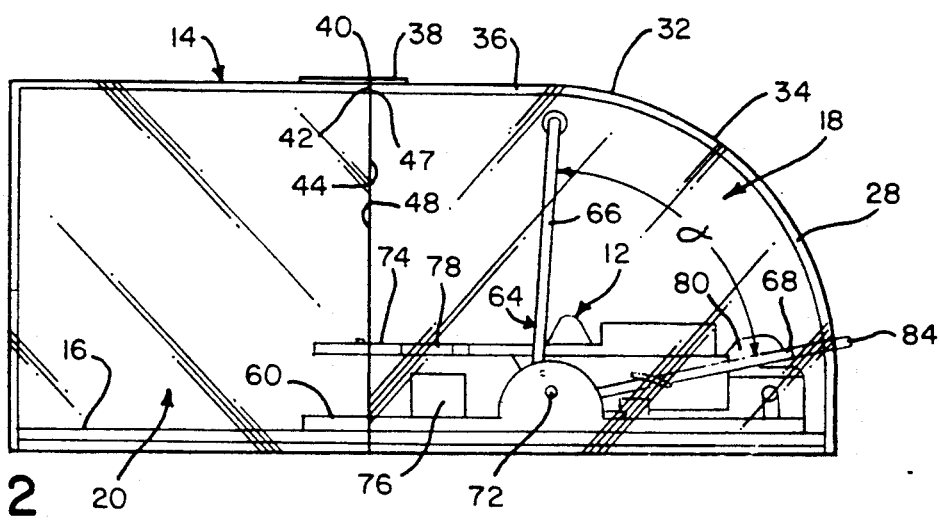
FIG. 2 is a side view of the mousetrap mechanism and housing of FIG. 1.
Figure 3:
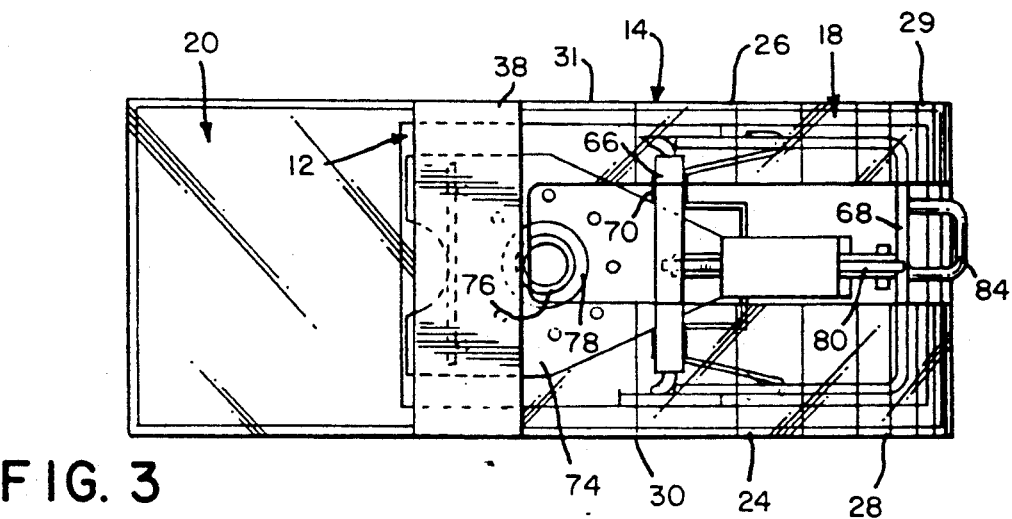
FIG. 3 is a top view of the mousetrap mechanism and housing of FIG. 1.
Figure 4:
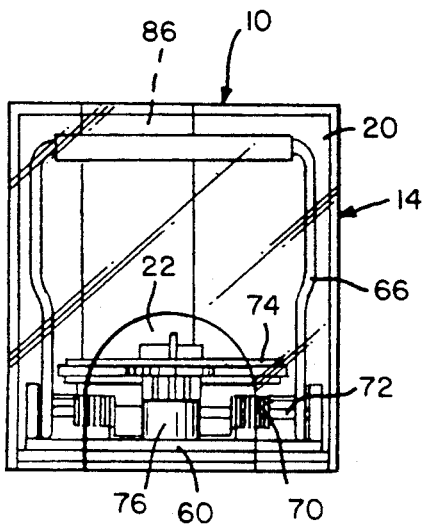
FIG. 4 is an anterior view of the mousetrap mechanism and housing of FIG. 1.
Figure 5:
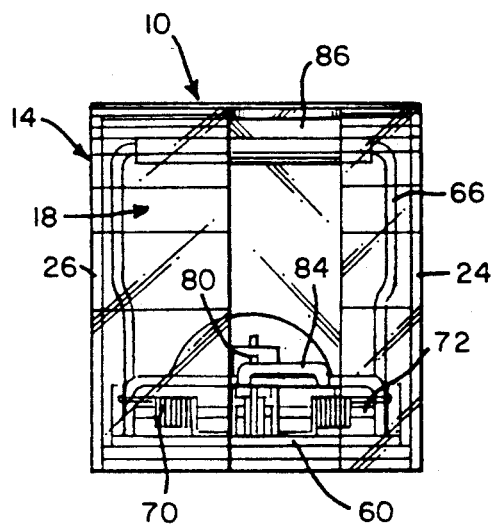
FIG. 5 is a posterior view of the mousetrap mechanism and housing of FIG. 1.

Referring now to the figures there is shown an arrangement for trapping mice, designated generally by the numeral 10, which includes a mousetrap mechanism, designated generally by the numeral 12 and a mousetrap housing, designated generally by the numeral 14, within which the mousetrap mechanism is placed. The mousetrap housing 14 may be opaque (FIG. 1), transparent or translucent (FIGS. 2-5 and 9). The mousetrap housing 14 comprises a base 16 to which is fixed a first housing portion designated generally by the numeral 18, which, as is seen in FIGS. 2 and 3, overlies a substantial portion of the mousetrap mechanism 12. Pivoted to the first housing portion 18 is a second housing portion, designated generally by the numeral 20, having an opening 22 therein through which the mouse enters. The first and second housing portions 18 and 20 cooperate with the base 16 to substantially completely enclose the mousetrap mechanism 12.

The first housing portion 18 has side walls 24 and 26 with arcuate upper edges 28 and 29 and straight upper edges 30 and 31 which are spanned a top wall 32 having an arcuate portion 34 overlying the arcuate edges and a straight portion 36 overlying the straight upper edges. The second housing portion 20 is connected to the first housing portion 18 by a flexible hinge 38 (which may be integral or unitary with the housing portions) to pivot about a line 40 at the front edge 42 of the straight portion 36 of top wall 32. Preferably, the hinge 38 is molded unitary with the housing portions 18 and 20. The second housing portion 20 includes rear side edges 44 and 46 and a top edge 47, which edges abut front edges 48 and 50 and the top front edge 42 of the first housing portion 18, shown in FIGS. 1-8, when in a first position in which the housing 14 is closed. The second housing portion pivots from a first position shown in FIGS. 1-8 to a second position shown in FIG. 9. While in the second position, the trap mechanism 12 is exposed for both baiting and disposing of dead mice.

Referring now specifically to the structure of the trap mechanism 12, it is seen that the trap mechanism 12 comprises a base plate 60 which is fixed to the base 16 of the housing 14. Alternatively, the trap mechanism could be molded into the base. The base plate 60 includes a pair of flanges 62 to which is pivoted a spring-biased striking element, designated generally by the numeral 64. The spring-biased striking element 64 includes a U-shaped striking bar 66 and a U-shaped cocking bar 68 which are fixed at an angle $\alpha$ with respect to one another to form a relatively rigid unit. A coil-spring 70 biases the striking element 64 to rotate about pivot 72 from the cocked position shown in solid lines FIGS. 1-7 to the uncocked or striking position shown in FIG. 8 (and in dotted lines in FIGS. 2 and 6) wherein the striker bar 66 pivots into proximity with a trigger plate 74. The trigger plate 74 is also pivoted on the base plate 60 of the trap mechanism 12 and preferably is co-pivoted on the pivot 72 with the coil spring 70 and striking element 64. A bait holder 76 is positioned in alignment with an opening 78 through the trigger member 74 so that a mouse in attempting to eat the bait in the bait holder 76 depresses the trigger member to release the cocking bar 68 from retention by a hook 80 held in retention with the cocking bar by the trigger member. Alternatively, the bait can be placed directly on the trigger member 74. It is emphasized here that the mousetrap 12 described thus far may have a configuration similar to U.S. Pat. Nos. 2,517,928; 2,616,211; or U.S. Pat. No. 4,462,739, each of which includes a spring-biased striking element comprised of a striker bar and cocking bar rigidly disposed at an angle with respect to one another. The mousetrap mechanism 12 may also include elements of expired U.S. Pat. Nos. 1,248,944 to Stilson and U.S. Pat. No. 2,544,475 to Uttz.

In accordance with the instant invention, the cocking bar 68 has a tab 84 rigidly associated therewith and projecting therefrom through a slot 86 in the arcuate portion 34 of the upper wall 32 enclosing the top and rear of the first housing 18. The tab 84 allows one to set the trap by engaging the tab with one's finger to rotate the cocking bar 68 in a clockwise direction about the pivot 72 from the uncocked dotted line position shown in FIGS. 2 and 6 to the solid line position shown in FIGS. 2 and 6 in which the hook 80 retains the cocking bar, and thus the striking element 64, in the cocked position with the striking bar 66 raised above the trigger member 74.

Figure 6:
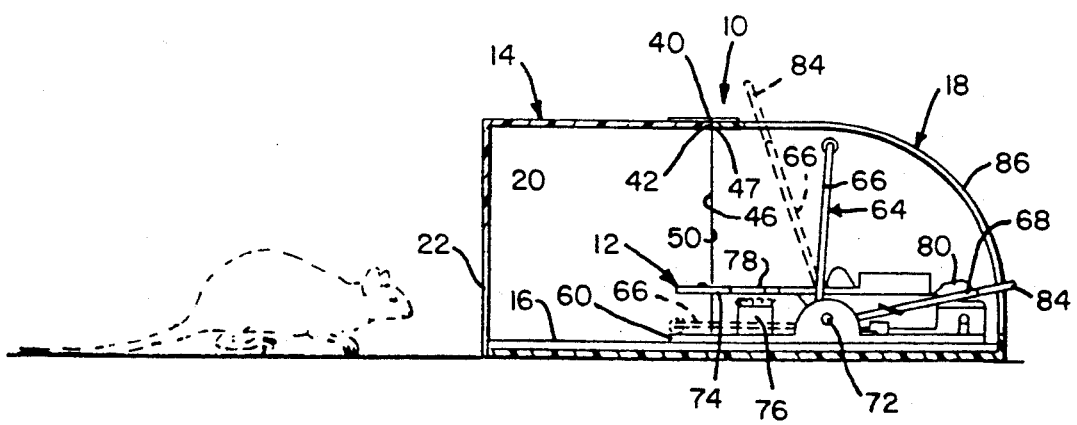
FIG. 6 is a side view, partially in elevation, showing a mouse approaching mousetrap housing with the cocked mousetrap therein.
Figure 7:
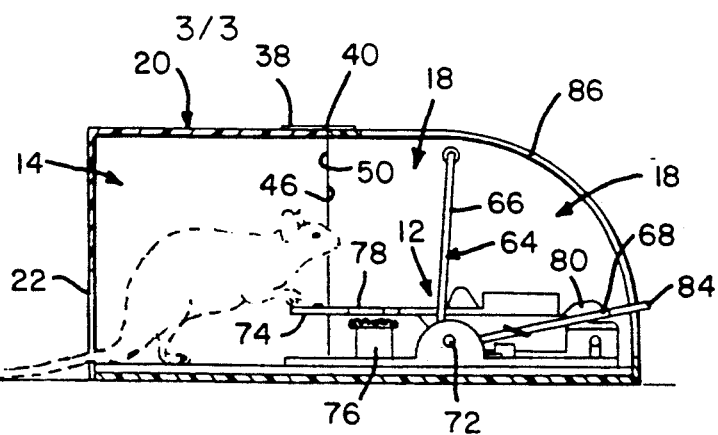
FIG. 7 is a side view similar to FIG. 6 showing a mouse tripping a trigger of the mousetrap mechanism.
Figure 8:
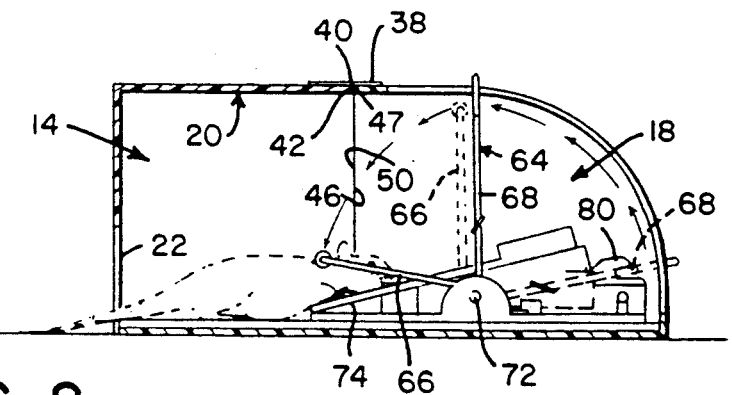
FIG. 8 is a side view similar to FIG. 7 showing the mousetrap mechanism after it has been sprung.

As is seen in FIGS. 6, 7 and 8 a mouse, unacquainted with the lethal nature of the trap mechanism 12, enters the housing 14 through the opening 22. In its desire to consume the bait the mouse steps on the trigger member 74. This releases the striking element 64 from retention by the hook 80. Within microseconds the striking bar 68 dispatches the mouse. The mouse's demise takes place within the enclosed housing 14 which, in accordance with one embodiment of the invention, may be made of an opaque plastic material so that the person using the trap 10 need not be overly familiar with its consequences.

Figure 9:
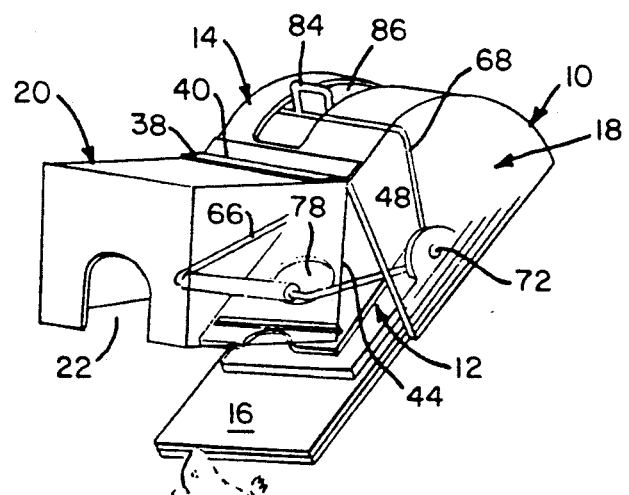
FIG. 9 is a perspective view showing how one removes a dead mouse from the mousetrap mechanism and housing.

As is seen in FIG. 9 the trap 10 may be emptied without the person using it touching or running the risk of touching the dead mouse. In order to empty the trap mechanism 12, the tab 84 is rotated clockwise, sufficient to lift the striker bar 66 from the dead mouse. Since the second housing portion 20 is freely pivoted by hinge 40 to the top of the first housing portion 18, it will pivot about pivot line 40, and rotate away from the first housing portion when the base 16 is oriented vertically. Consequently, the deceased mouse can drop away from the trap 10 into the trash can without the person having to touch the mouse or even look at it. The trap may then be rebaited with the striking element 64 in the dotted line position of FIG. 6 and thereafter reset by rotating the tab 84 from the dotted line position to the solid line position of FIG. 6.

In considering the structure of the mousetrap, the housing 14 can be considered divided into two portions 18 and 20, one of which has a first opening 86 therein through which a portion 84 of the trap mechanism projects and the other of which has a second opening 22 through which the mouse enters. As is readily seen in FIG. 2, the trigger 77 and bait station 76 are spaced from the opening 22 so as to enhance the effectiveness of the trap.

The afore-described housing, in combination with a standard mousetrap of proven design, takes advantage of all of the improvements made in standard mousetraps over the past century while minimizing the safety hazards inherent in standard mousetraps and to a considerable extent concealing some of the rather unpleasant aspects of trapping mice.

The entire disclosures of all applications, patents and publications, cited above and below, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A housing for containing a mousetrap mechanism, the housing comprising:
    a base for supporting the mousetrap;
    a first housing portion fixed to the base and overlying at least a portion of the mousetrap mechanism, the first housing portion having a slot therein through which the mousetrap mechanism is accessed for cocking the mousetrap mechanism;
    a second housing portion having an opening therethrough through which a mouse can enter, and
    means for movably mounting the second housing portion with respect to both the first housing portion and base, wherein the second housing portion is selectively movable from a first position in which the mousetrap is completely shielded to a second position in which the housing opens for disposal of a mouse caught therein.

2. The housing of claim 1 wherein the first housing portion and second housing portion have top walls spaced from the base and wherein the second housing portion is pivoted to the first housing portion along a pivot line where the top walls of the housing portions meet.

3. The housing of claim 2 wherein the slot in the first housing portion is in the top wall thereof and wherein a tab on the mousetrap mechanism extends through the slot for cocking the mousetrap mechanism.

4. The housing of claim 3 wherein the first housing portion includes side walls with an arcuate upper edge whereby the top wall has an arcuate surface in which the slot is formed.

5. The housing of claim 4 wherein the second housing portion freely abuts the first housing portion and base so as to swing open freely about the pivot line to allow the deceased mouse to drop from the housing when released by the trap mechanism.

6. The housing of claim 5 wherein the housing is made of an opaque material.

7. The housing of claim 1 wherein the housing is made of an opaque material.

8. The housing of claim 1, wherein the housing is made of a transparent material.

9. The housing of claim 1, wherein the housing is made of a translucent material.

10. In combination, a mousetrap mechanism and housing within which the mousetrap mechanism is positioned, the combination comprising:
    with respect to the mousetrap mechanism:
        a spring-biased striking element comprising a striker bar and a cocking bar, the cocking bar projecting at an angle with respect to the striker bar, and
        a trigger member positioned proximate the striking element and being disposed in proximity with a bait holder;
    and with respect to the housing;
        a first housing portion attached to the base and enclosing a portion of the mousetrap, the first housing portion having a slot therein through which a portion of the cocking bar extends for cocking the mousetrap by a force applied external to the housing;
        a second housing portion having a hole therein through which a mouse can enter the housing, and
    means for mounting the second housing portion for movement with respect to the first housing portion and the base, whereby the second housing portion moves from a first position, in which the second housing portion cooperates with the first housing portion to completely enclose the mousetrap mechanism with the opening of the second housing portion positioned adjacent to the trigger member, to a second position in which a portion of the base proximate the trigger member is exposed, whereby a deceased mouse can be removed from the trap by rotating the striker toward the cocked position while the second housing portion is in the second position.

11. The combination of claim 10, wherein the first housing portion and second housing portion have top walls spaced from the base and wherein the second housing portion is pivoted to the first housing portion along a pivot line where the top walls of the housing portions meet.

12. The combination of claim 11, wherein the slot in the first housing portion is in the top wall thereof and wherein a tab on the mousetrap mechanism extends through the slot for cocking the mousetrap mechanism.

13. The combination of claim 12, wherein the first housing portion includes side walls with an arcuate upper edge whereby the top wall has an arcuate surface in which the arcuate slot is formed.

14. The combination of claim 10, wherein the second housing portion freely abuts the first housing portion and base so as to swing open freely about the pivot line to allow the decreased mouse to drop from the housing when released by the trap mechanism.

15. The combination of claim 14, wherein the housing is made of an opaque material.

16. The combination of claim 10, wherein the housing is made of an opaque material.

17. The combination of claim 10, wherein the housing is made of a transparent material.

18. The combination of claim 10, wherein the housing is made of a translucent material.

19. A mousetrap comprising:
    a trap mechanism comprising a striker bar, means for releasably holding the striker bar in a cocked position and trigger means for releasing the striker bar from the cocked position upon being disturbed by a mouse, and a housing having at least two portions, the housing containing the trap mechanism, the housing having a first opening therein through which a portion of the trap mechanism projects for cocking the trap mechanism and a second opening therein through which the mouse enters, and the housing including hinge means for allowing one portion of the housing to move readily with respect to the other portion of the housing to allow opening the housing to expose the trap for both readily baiting the trap and readily releasing a trapped mouse therefrom.

20. The mousetrap of claim 19, wherein the second opening is in one of the portions of the housing at a location spaced from the tripper means and wherein the trap is baited at a bait station in proximity with the trigger means whereby the effectiveness of the mousetrap is enhanced.

21. The mousetrap of claim 19, wherein the first opening is in one portion of the housing and the second opening is in the second portion of the housing.

* * * * *